Jan. 19, 1937.    G. A. BRAGG    2,067,899
MANUFACTURE OF AMMONIUM SULPHATE
Filed Jan. 20, 1932
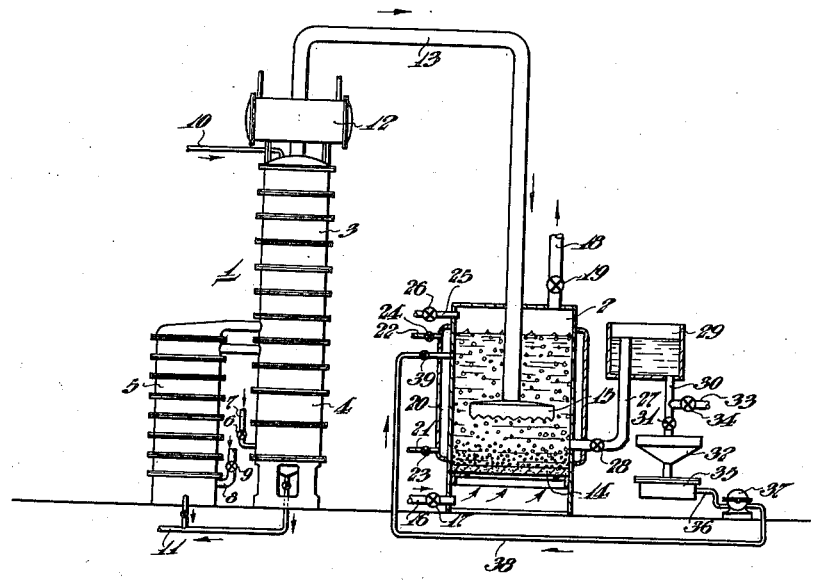
INVENTOR.
Gilbert A. Bragg.
BY Jesse P. Langley
ATTORNEY.

Patented Jan. 19, 1937

2,067,899

UNITED STATES PATENT OFFICE 2,067,899

MANUFACTURE OF AMMONIUM SULPHATE

Gilbert A. Bragg, Pittsburgh, Pa., assignor, by mesne assignments, to Koppers Company, a corporation of Delaware Application January 20, 1932, Serial No. 587,630

1 Claim. (Cl. 23—119)

This invention relates to the manufacture of ammonium sulphate.

An object of the present invention is to provide a process by which ammonium sulphate may be efficiently and economically manufactured on a commercial scale, and a further object is to provide a process which is particularly useful in gas manufacturing plants for the recovery of by-products without any considerable additional equipment.

The process of the present invention comprises contacting ammonia-containing gases, such as ammonia still gases, with an aqueous medium and introducing sulphur dioxide and oxygen or air to produce ammonium sulphate.

The aqueous medium is preferably maintained at a temperature which will bring about a rapid reaction to form a high yield of ammonium sulphate and also to prevent contamination by substances present in the ammonia still gases. By maintaining the aqueous medium in acid condition, which is readily accomplished by introducing an excess of sulphur dioxide, substantially none of the hydrogen sulphide which may be present in still gases will be absorbed but will pass through.

By maintaining the aqueous medium both in a heated condition and in an acid condition, the hydrogen sulphide is more likely to pass through than when the aqueous medium is at relatively low temperatures or when it is in neutral or alkaline condition, although the formation of ammonium sulphate will take place under any of these conditions with relatively different results. By maintaining the solution above, for example, 100° C., the steam in the ammonia still gases will not condense in the aqueous medium and revaporization is avoided.

The present process is preferably carried on in such a manner that substantially no dilution of the aqueous medium occurs. The ammonia still gases contain moisture which is carried into the aqueous medium, and in sweeping the oxygen-containing gases through the aqueous medium, the gases leaving the surface of the aqueous medium carry out moisture. Conditions may be controlled so that the moisture carried out in substantially equal to the moisture carried in, whereby the volume of the aqueous medium is maintained substantially constant.

If desired, conditions may be so controlled that dilution of the aqueous medium may be permitted to take place by condensation of moisture carried in by the still gases. Dilution may be accomplished by maintaining the temperature somewhat below that required to maintain the volume of the aqueous medium constant.

For instance, assuming that the ammonia still gases contain, under ordinary operating conditions, about one pound of ammonia to nine pounds of water vapor, and assuming that the oxidizing gases introduced contain about 8% sulphur dioxide, the temperature of the aqueous medium must be kept at approximately 93° to 94° C. in order to maintain the volume constant. To bring about dilution, the temperature of the aqueous medium may be kept below 93° to 94° C., and to bring about concentration the temperature may be kept above 93° to 94° C. for any desired period.

In the accompanying drawing showing for purposes of exemplification a preferred form and manner in which the invention may be embodied and practiced, the single figure is an elevational view, partially in cross section, of apparatus employed in connection with the present process in a preferred arrangement.

The apparatus shown in the accompanying drawing comprises an ammonia still 1 of well known construction and a chamber 2 in which ammonium sulphate is produced. The ammonia still 1 is of the type ordinarily employed in distilling ammonia liquor obtained in the scrubbing of gases particularly coal gases produced in coal distillation plants and comprises a free ammonia section 3, a lime leg 4 and a fixed ammonia section 5.

Steam is introduced into the bottom of the lime leg 4 through a pipe 6 provided with a valve 7 and into the bottom of the fixed ammonia section 5 through a pipe 8 provided with a valve 9. The still is charged through a pipe 10 which conducts the ammonia liquor into the top of the free ammonia section 3 and the still waste is withdrawn from the bottom through a pipe 11. The free ammonia section 3 is provided with a dephlegmator 12 and a pipe 13 which conducts the vapors from the dephlegmator into the chamber 2.

The chamber 2 which may be of any desired height is provided with a porous plate 14 which is supported above the bottom of the chamber. The pipe 13 is directed into the chamber and terminates a relatively short distance above the plate 14. The end of the pipe 13 is preferably provided with a distributor 15.

A pipe 16 provided with a valve 17 enters the chamber below the plate 14 and is employed for introducing sulphur dioxide and oxygen. An outlet pipe 18 provided with a valve 19 is connected to the top of the chamber 2.

The chamber 2 may be provided with a heating jacket 20 to which are connected pipes 21 and 22 provided with valves 23 and 24, respectively, for circulation of a heating fluid, or a cooling medium.

A pipe 25 provided with a valve 26 enters the chamber 2 above the plate 14 for charging the chamber with the aqueous medium to be used in the process. An overflow pipe 27 provided with a valve 28 is connected to the chamber 2 above the plate 14 and leads to a trough 29.

A pipe 30 provided with a valve 31 is connected to the trough 29 and leads to a crystallizer or cooler 32. A branch pipe 33 provided with a valve 34 is connected to the pipe 30 for withdrawing the aqueous medium from the system.

Beneath the crystallizer 32 is a centrifuge 35 to which is connected a pipe 36 for withdrawing mother liquor. The pipe 36 leads to a pump 37 which pumps the mother liquor through a pipe 38 provided with a valve 39 to the chamber 2 above the plate 14.

In carrying out the process of the present invention in the apparatus described, an aqueous medium such as plain water or preferably a solution containing ammonium sulphate is charged into the chamber 2 through the pipe 25. For most purposes the solution introduced is preferably a saturated solution of ammonium sulphate, as for instance a solution containing around 550 grams of ammonium sulphate per liter at 20° C. When commencing the process with water, this condition may be eventually arrived at while proceeding with the process.

The still 1 is operated in the usual manner and the vapors therefrom are introduced into and distributed in the aqueous medium in the chamber 2 while at the same time sulphur dioxide and air or gases containing free oxygen are introduced into the chamber 2 through the pipe 16 beneath the plate 14. The sulphur dioxide may be obtained for instance by burning sulphur or sulphide ores or hydrogen sulphide gas. It is mixed with air or oxygen in any desired proportions. Satisfactory results are obtained from mixtures of 5 to 8% by volume of sulphur dioxide in air.

The operation of the still and the introduction of the sulphur dioxide and oxidizing gases are controlled so that the aqueous medium is preferably in an acid condition and so that the ammonia is substantially entirely absorbed thereby.

The sulphur dioxide and air are introduced into the solution in a finely comminuted state by means of the porous plate 14. Any well known and suitable comminuting means may be employed.

To maintain a high efficiency, the aqueous medium in the chamber 2 is preferably heated to a temperature of from substantially 80° C. to the boiling point of the solution formed. By the proper manipulation of valves 17, 19, 28 and the still 1, the treatment in the chamber 2 may be carried on above atmospheric pressures. Pressures as well as temperatures may be varied in order to bring about condensation or evaporation of water vapor.

Waste gases are withdrawn through the pipe 18 and when the ammonia liquor contains sulphides these waste gases will contain hydrogen sulphide which may be removed by any well known means. If the ammonia liquor treated in the still 1 is substantially free from sulphur compounds the vapors in the pipe 18 will be substantially free from hydrogen sulphide.

The solution formed in the chamber 2 may be withdrawn continuously or intermittently through the pipe 27 and passed into the crystallizer 32. By cooling the solution below the point at which a saturated ammonium sulphate solution is obtained, crystals of ammonium sulphate will separate out and the resulting slurry may be centrifuged in the centrifuge 35. The mother liquor is pumped back to the chamber 2 through the pipe 38.

Under certain conditions described in an application of Fred Denig, Serial No. 586,322, filed January 13, 1932, conditions may be so controlled in the chamber 2 that ammonium bisulphate is formed, in which case this may be withdrawn through the pipe 33 to produce therefrom the normal sulphate by a further treatment with ammonia, as described in the aforesaid application.

It is found that in producing ammonium sulphate in the manner described, proportionately high yields of relatively pure ammonium sulphate are obtained at a relatively low cost. One of the principal items of cost in the production of ammonium sulphate is in the evaporation of water to obtain crystallization of ammonium sulphate. By the present process the necessity for evaporation to obtain crystallization is practically eliminated.

The invention as hereinbefore set forth is embodied in a particular form but may be variously embodied within the scope of the claim hereinafter made.

I claim as my invention:

In a process of preparing ammonium sulphate directly from $SO_2$, ammonia and oxygen which process comprises introducing the $SO_2$ and oxygen through a porous medium into a bath of saturated ammonium sulphate simultaneously with the introduction of the ammonia into the bath to thereby form ammonia sulphate directly from the $SO_2$, oxygen and ammonia in the bath, the improvement comprising: introducing the ammonia as ammonia still gases resulting from direct steam distillation of ammonia liquor into the saturated ammonium sulphate bath and while the gases are still hot from the ammonia distillation and maintaining the temperature of the bath at approximately 93° to 94° C. in order to maintain the volume constant and withdrawing the spent ammonia still gases from the bath while still containing their original content of water vapor.

GILBERT A. BRAGG.